United States Patent [19]
Willuweit et al.

[11] 3,877,547
[45] Apr. 15, 1975

[54] OIL MIST LUBRICATING SYSTEM FOR MACHINES

[75] Inventors: Werner Willuweit, St. Clair Shores; Terence D. Jordan, East Detroit, both of Mich.

[73] Assignee: F. Jos. Lamb Company, Warren, Mich.

[22] Filed: June 29, 1973

[21] Appl. No.: 374,961

[52] U.S. Cl. ............... 184/6.26; 55/468; 184/6.23
[51] Int. Cl. ................................................ F16n 7/32
[58] Field of Search ....... 184/6.26, 6.12, 6.14, 55 R, 184/55 A, 6.23; 74/606 A; 55/468, 431; 277/15

[56] References Cited
UNITED STATES PATENTS

| | | | |
|---|---|---|---|
| 2,843,142 | 7/1958 | Gardner | 55/468 |
| 3,042,462 | 7/1962 | Rosskopf | 184/6.26 X |
| 3,378,104 | 4/1968 | Venable | 184/6.12 |
| 3,665,684 | 5/1972 | White | 184/55 A |

Primary Examiner—Manuel A. Antonakas
Attorney, Agent, or Firm—Barnes, Kisselle, Raisch & Choate

[57] ABSTRACT

A machine tool having a housing enclosing gears in driving relation with a spindle projecting from the housing at one end through a labyrinth seal is lubricated with a pressurized oil mist. A conduit connected with the housing adjacent the seal leads to the throat of a venturi passageway through which a liquid (such as a coolant) is directed under pressure to a reservoir. The vacuum produced at the throat of the venturi causes the oil mist to be drawn from the housing for disposal.

3 Claims, 1 Drawing Figure

PATENTED APR 1 5 1975  3,877,547
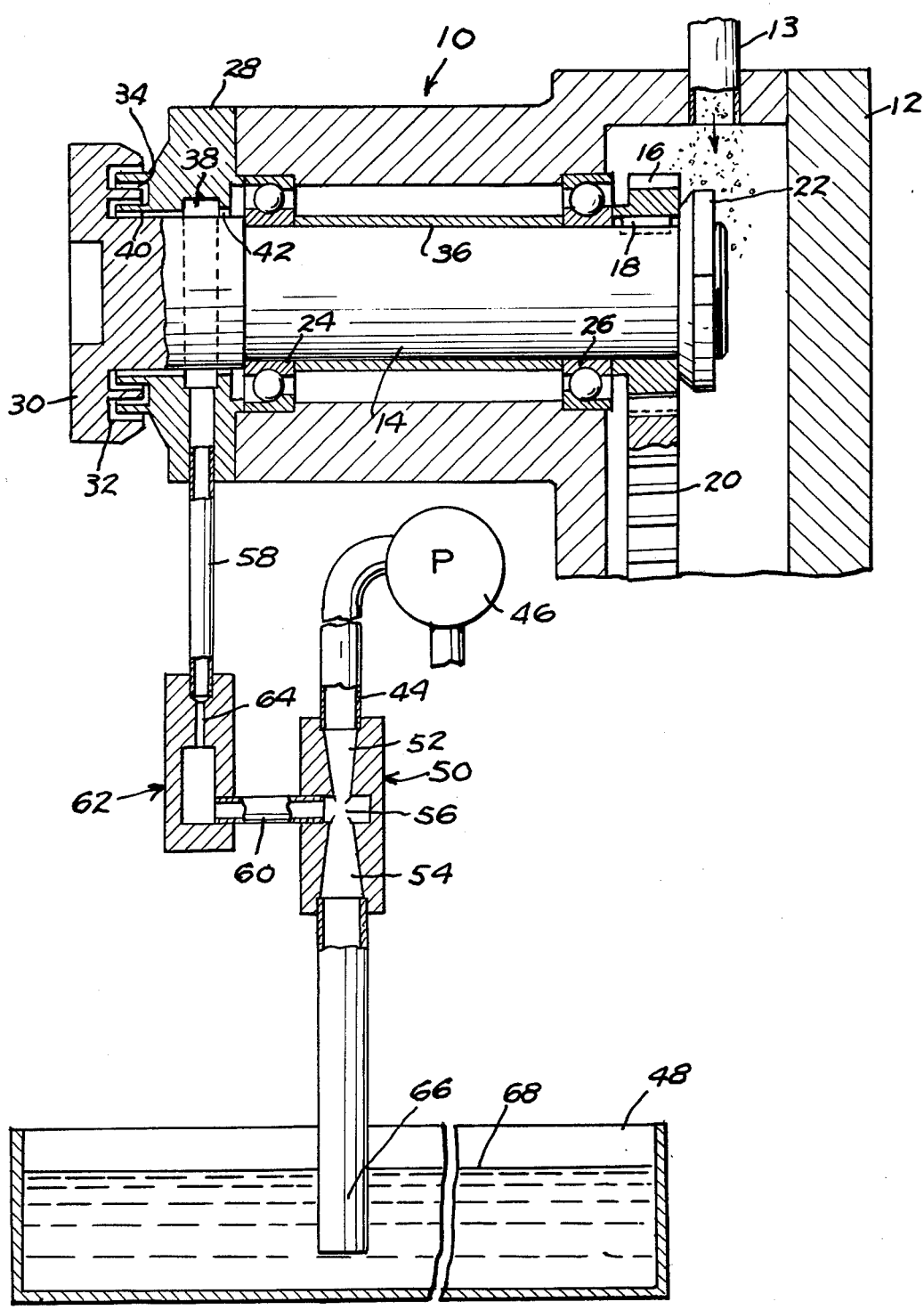

OIL MIST LUBRICATING SYSTEM FOR MACHINES

This invention relates to an oil mist lubricating system for machines and, more specifically, has to do with a means for collecting the oil mist from within a housing of the machine in which the lubricated components of the machine are located.

The housed moving parts (such as gears, spindles and the like) are frequently lubricated by introducing into a machine housing containing such parts a pressurized oil mist-air mixture. One of the problems involved in a lubricating system of this type resides in the collection of the oil mist from within the housing in such a manner as to prevent it from leaking through seals around the rotating shafts and, thus, contaminating the ambient air. When machines are large and contain many elements to be lubricated large amounts of oil mist must be introduced and a greater amount of oil mist has a tendency to escape. This problem is compounded in the case of machine tool transfer lines where many machines are located in relatively close proximity.

The present invention has for its primary object the collection and disposal of such oil mist without contaminating the surrounding air.

More specifically, the present invention contemplates the removal and disposal of such oil mist from a machine housing by connecting an oil mist drain line to the housing at a portion thereof adjacent a shaft oil seal. The drain line has a mist condensing device therein and extends to a venturi in a conduit of a pressurized liquid line in the machine so that the outlet of the drain line is subjected to a negative pressure which causes the oil mist to be drawn out of the housing, condensed and combined with the liquid flowing in the pressurized liquid line from which it can be readily separated so as to allow uncontaminated air to escape to the surrounding atmosphere.

Other features and objects of the present invention will become readily apparent from the accompanying description and the single FIGURE showing a somewhat schematic sectional view of an arrangement of the present invention as applied to a machine tool.

In the drawing, a machine tool gear box or housing is designated 10 and has a removable cover 12 closing an open section thereof. A pressurized oil mist is directed into housing 10 through any suitable means, such as a conduit 13. Within housing 10 there is journalled a shaft 14 which is driven by a gear 16 keyed to shaft 14 as at 18 and meshing with a drive gear 20. Gear 16 is secured on the inner end of shaft 14 by a nut 22. Shaft 14 is journalled in housing 10 by bearings 24,26. The other end of shaft 14 extends outwardly of the housing 10 through an end cap 28. Head 30 on the outer end of shaft 14 is formed with annular grooves 32 which cooperate with annular grooves 34 on cap 28 to provide a labyrinth seal between shaft 14 and cap 28. In the drawing, grooves 32 and 34 are shown slightly exaggerated in size. Bearings 24,26 are preloaded in any suitable manner, as by utilizing the various shoulders illustrated on shaft 14 and housing 10 in combination with spacer sleeve 36.

End cap 28 is formed with an annular groove 38 which is disposed between bearing 24 and the labyrinth seal formed by grooves 32,34. Groove 38 communicates with the labyrinth seal through the annular clearance space 40 and is also in communication with the portion of housing 10 in which gears 16,20 are located through the clearance space 42, the spaces between the bearing balls of the bearings and the space between the bearings themselves.

A conduit 44 extends from the outlet of a pump 46 and is adapted to direct coolant liquid under pressure to a return trench 48. A venturi fitting 50 is disposed in conduit 44. Fitting 50 includes a velocity increasing converging portion 52 and a diverging jet portion 54 which are interconnected by a throat 56. A drain line 58 for oil mist extends into cap 28 and communicates directly with annular groove 38. The outlet 60 of drain line 58 communicates with the throat 56 of venturi fitting 50. Between its inlet and outlet there is arranged in drain line 58 an oil classifier 62 having a restricted passageway 64 therein which is sized to condense all the oil mist from the air so that liquid oil and air are directed through outlet 60 to the throat 56 of venturi fitting 50. As is well understood, the flow of high pressure coolant through venturi fitting 50 produces a negative pressure at throat 56, thus establishing a vacuum at the outlet 60 of drain line 58.

It will be understood that it is not essential that the liquid in conduit 44 be a coolant. However, in the case of a machine tool used for a cutting operation, coolant is conventionally employed for cooling and lubricating the cutting tools on the machine. Accordingly, in the case of such machine tools the liquid coolant, which is pumped back to the reservoir in any event, is ideally suited as the pressure fluid in conduit 44.

The vacuum created at throat 56 of venturi fitting 50 serves to draw the oil mist-air mixture from annular groove 38 through the restriction passageway 64 in classifier 62, thus condensing the oil mist into air and liquid oil drops which combine with the coolant flowing through conduit 44 into the coolant return trench 48. The outlet end 66 of conduit 44 extends below the surface of the liquid 68 in trench 48 so that the entrained air comes to the surface and returns in an uncontaminated condition to the atmosphere. The oil entrained with the coolant travels to a suitable reservoir or other receiver and, since the oil has a specific gravity lower than the coolant, it floats on the surface and can be readily separated from the coolant by skimming or other suitable means.

The head 30 at the other end of shaft 14 would normally be utilized for driving a spindle on which the cutting tool or tools of the machine are mounted. Accordingly, it is not unusual for the coolant used on the cutting tools to splash or otherwise flow around the head 30. If the coolant should pass through the labyrinth seal formed by the annular grooves 32,34 it will flow through the drain line 58 together with the oil mist and, thus, be prevented from in any way contaminating the moving parts of the mechanism.

We claim:

1. A machine having a housing enclosing movable parts including, means for introducing a pressurized oil mist-air mixture into the housing to lubricate said moving parts, a first conduit having an inlet connected with the housing and communicating with the interior thereof, a second conduit conducting pressurized liquid having a specific gravity different from that of the oil, said second conduit having an aspirating means therein, said first conduit having an outlet connected to said aspirating means so that the outlet is subjected to the reduced pressure created by said aspirating means whereby to create a pressure differential between the inlet and the outlet of the first conduit which causes the oil mist-air mixture in the housing to be discharged therefrom through said first conduit, the second conduit having an outlet communicating with a reservoir means from which the entrained air from the housing is adapted to escape.

2. A machine as called for in claim 1 wherein said liquid comprises a coolant utilized for cooling and lubricating cutting tools on the machine.

3. A machine having a housing, a rotatable shaft in said housing, bearing means in said housing journalling said shaft, at least one opening in the housing through which the shaft extends to the exterior of the housing, each opening through which the shaft extends having a seal therein surrounding the shaft, said seals separating the atmosphere within the housing from the atmosphere exterior of the housing adjacent the peripheral surface of the shaft and defining a restricted flow passageway therebetween, means forming a chamber in the housing surrounding said shaft and disposed axially between each seal and said bearing means, each of said chambers having an outlet passageway connected thereto, said outlet passageways being distinct from flow passageways across said bearing means and said seals, means for applying a sub-atmospheric pressure to the outlet passageway of each of said chambers to maintain said chambers at a pressure below atmospheric and thereby establish a pressure differential across each seal and across said bearing means which tends to produce a flow of air into said chambers across said seals and across said bearing means, means defining a second chamber in the housing spaced axially from each of the first-mentioned chambers and on the axially opposite side of said bearing means from the first-mentioned chambers, and means for directing a pressurized oil mist-air mixture into said second chamber whereby the sub-atmospheric pressure in each of said first-mentioned chambers causes said mixture to flow to each of said outlet passageways rather than through any of said seals and also causes any airborne matter passing into said first-mentioned chambers through said seals to likewise flow to each of said outlet passageways rather than across said bearing means.

* * * * *